June 18, 1940.　　　M. E. SULLIVAN　　　2,205,318
ICE WATER BEER COOLER
Filed March 1, 1940
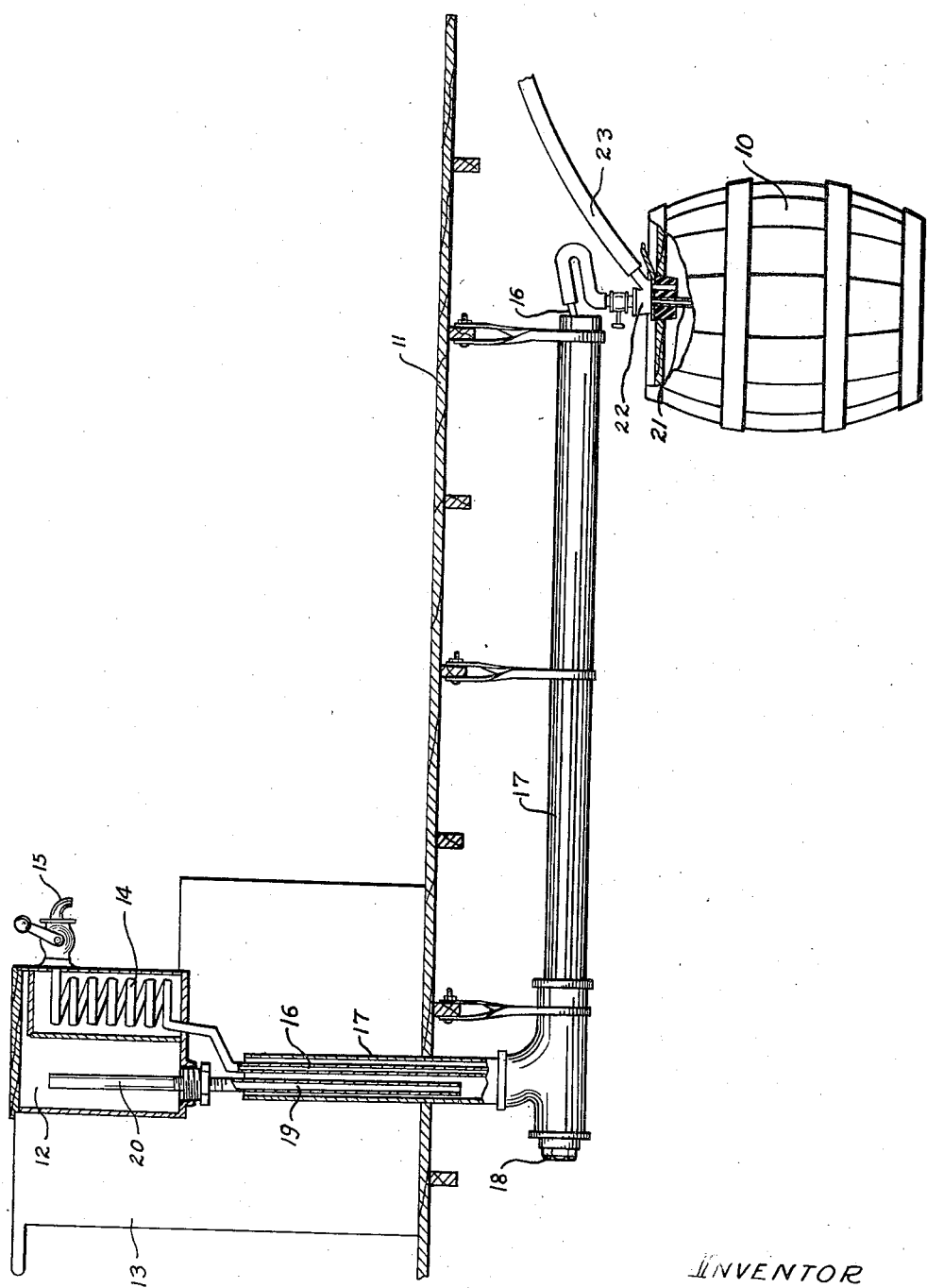
INVENTOR
MARTIN E. SULLIVAN
BY *Minturn & Minturn,*
ATTORNEYS Patented June 18, 1940

2,205,318

UNITED STATES PATENT OFFICE 2,205,318

ICE WATER BEER COOLER

Martin E. Sullivan, Indianapolis, Ind., assignor of fifteen per cent to Annie Garrity, and twenty-five per cent to Wilfred Cardis, both of Indianapolis, Ind.

Application March 1, 1940, Serial No. 321,655

3 Claims. (Cl. 62—33)

This invention relates to means for cooling beer or any liquid to be dispensed in a chilled state and has for a primary object the provision of means which will so cool the liquid to be dispensed that the liquid will be in the same condition when drawn from a dispensing line or coil at frequent intervals or when drawn after a considerable interval of time has elapsed, such as the time between drawing the liquid at night and again the first thing in the morning.

While the invention may be applied as above indicated to any kind or type of liquid being dispensed, that is, to be dispensed in a cool state, it is particularly adapted to the cooling of beer and the description of the invention is herein made as applying to that one liquid although the invention is not intended to be limited thereto.

It is well known to those versed in the art that the usual arrangement for dispensing beer is to place the beer containing keg or barrel in a basement or at some point removed from the dispensing zone and to apply some sort of refrigerating means about the keg or barrel so as to hold the beer therein at the desired temperature. A tube or pipe is then carried from the beer container usually a considerable distance to the coil box located at the bar or counter where the beer is to be dispensed. This conducting tube is thus exposed to the temperature of the air between the beer container and the ice box and since this conductor is generally of quite small diameter and made out of tin, which is a good conductor, the beer in that conductor is brought up to the temperature of the air regardless of how much it has been chilled initially in the original container.

In order to overcome this condition generally encountered, the tube leading from that beer container below connects with a coil of tubing in the counter ice box so that the beer is again chilled and may be withdrawn in that chilled condition. However, this coil in the ice box is of small capacity and must be, for efficient cooling, and, therefore, if the beer is being dispensed quite rapidly, one glass after another, it is apparent that there is not sufficient time for the beer to become fully chilled in passing through the coil as it passes through that coil from the heated length between the coil and the beer keg or barrel. A more noticeable condition encountered, however, is that after there has been no dispensing of the beer over a considerable interval of time, and then the beer is drawn, the beer will unduly foam with the result that in order to obtain a relatively full glass of beer, the foam has to be scraped off and thrown away and this means a considerable loss in the beer itself. It seems that when the warmer column of beer in the long conducting pipe strikes the small volume of chilled beer in the coil or when that warmer beer strikes the cold walls of the coil, some deleterious effect is immediately noticed in the beer being drawn.

With that situation in mind, the present invention has been evolved and found to overcome those difficulties with an unusual degree of success. The invention is accordingly described in the one particular form in the accompanying drawing in which the single view is a diagrammatic representation in vertical section and partial elevation of a structure embodying the invention.

Referring to the drawing, a barrel 10 of beer is located below the floor 11 of the room in which the beer is to be dispensed. Incidently it is to be noted that by reason of my invention, I am able to utilize beer in barrels rather than in the smaller kegs without deterioration. The usual ice box 12 is located in the counter 13 to have the coil 14 arranged therein to connect with the dispensing faucet 15 and connected by its lower end with the conducting tube 16 that goes down through the floor 11 and is eventually connected with the barrel 10.

Now instead of carrying this tube 16 along under the floor 11 exposed to the air in the usual manner, I provide a pipe 17 through which the tube 16 is carried, the internal diameter of the pipe 17 being considerably larger than the external diameter of the tube 16. As indicated by the drawing, the tube 16 enters this pipe 17 as quickly as possible after it leaves the ice box 12 which means that an upright section of the pipe 17 is provided. The pipe 17 is provided with a clean-out plug 18 at one end so that the interior of the pipe 17 may be flushed out with water or the like and kept clean.

The ice box 12 is provided with an overflow drain pipe 19 from which extends a stand pipe 20 up into the ice box determining the elevation of the ice water in the box. Preferably the pipe 20 is removable so that the box may be completely drained out for cleaning at desired intervals, but in general usage, ice will be packed into the box 12 and melt therein, the water eventually overflowing through the pipe 20 and down through the drain pipe 19. The pipe 19, as indicated, discharges directly into the pipe 17. The pipe 17 is preferably sloped to its open end under which the barrel 10 is centrally positioned so that the ice water dropping into the pipe 17 eventually discharges from the pipe 17 and drops downwardly onto the top of the barrel 10 directly onto the barrel head.

The end of the tube 16 which extends from the discharge end of the pipe 17 is connected in the usual manner to the barrel dispensing pipe 21, the usual barrel head fitting 22 being employed for this purpose and connecting with the pressure supply line 23.

It is thus to be observed that by reason of the construction and assembly above indicated, water is utilized as it overflows from the ice box 12 to chill the interior of the pipe 17, the pipe 17 being sufficiently large to contain a considerable volume of air that eventually becomes chilled by reason of the cold ice water flowing therethrough. The tube 16 passing through this chilled air is thus maintained at the temperature of that chilled air from the time it leaves the barrel 10 until it reaches the coil 14 and is dispensed through the faucet 15.

The ice water discharging from the open end of the pipe 17 falls centrally onto the barrel 10 and eventually rises to flow over the ends of the staves and flows down over the side of the barrel, thus chilling and keeping the barrel cool without having to apply ice thereto or other refrigeration. In other words, by simply keeping the ice box 12 well packed with ice so that its melting will provide an overflow of cold water through the stand pipe 20, there will be no zone in which the beer will stand in a temperature above that desired for dispensing. In short, there are no heated zones resulting in warm beer striking cold zones and the like.

Not only do I obtain a superior beer in dispensed form and prevent waste of beer, but I also secure a great saving in the cost of ice for the reason that instead of discarding the overflowing ice water from the ice box 12, all of the water is utilized in further refrigerating action by conducting it down through the pipe 17 and flowing it over the barrel 10.

While I have herein shown the barrel 10 to be below the floor 11, it is obvious that the same results may be obtained by placing the barrel 10 or preferably a smaller keg in the compartment at the side of or under the ice box 12 and then carrying the ice water down over the barrel 10 and around the interconnecting pipe in the same manner.

Therefore, while I have herein shown and described my invention in the one form as now known to me, it is obvious that structural variations may be employed without departing from the spirit of the invention and I, therefore, do not desire to be limited to that precise form beyond the limitations as may be imposed by the following claims.

I claim:

1. In combination with an ice box, a dispensing faucet, a liquid container, and a liquid conductor pipe leading from the container through said ice box to said faucet, a conductor pipe shield surrounding substantially the major length of said pipe and having an internal diameter greater than the external diameter of the pipe, and a water discharge pipe leading from said ice box to discharge into said shield at the end thereof nearest the box, said shield discharging by its other end over the top end of said container, whereby flow of ice-water is had from said box throughout the length of said shield onto said container.

2. In combination with an ice box, a dispensing faucet, a liquid container, and a liquid conductor pipe leading from the container through said ice box to said faucet, a conductor pipe shield surrounding substantially the major length of said pipe and having an internal diameter greater than the external diameter of the pipe, and a water discharge pipe leading from said ice box to discharge into said shield at the end thereof nearest the box, said shield discharging by its other end over the top end of said container, whereby flow of ice-water is had from said box throughout the length of said shield onto said container, said container having a cupped upper end to receive and retain a quantity of said water, the overflow of which falls down over the side of the container, and said shield having a fall throughout its length to have constant drainage of the shield and to create a cool atmosphere therein.

3. In combination with an ice box, a dispensing faucet, a liquid container, and a liquid conductor pipe leading from the container through said ice box to said faucet, a conductor pipe shield surrounding substantially the major length of said pipe and having an internal diameter greater than the external diameter of the pipe, and a water discharge pipe leading from said ice box to discharge into said shield at the end thereof nearest the box, said shield discharging by its other end over the top end of said container, whereby flow of ice-water is had from said box throughout the length of said shield onto said container, said shield constituting a chamber, the atmosphere of which is cooled by trickling of said water therethrough and said water being drained from the shield at substantially the same rate it is fed into it.

MARTIN E. SULLIVAN.